US012555468B2

(12) United States Patent
Marzorati et al.

(10) Patent No.: US 12,555,468 B2
(45) Date of Patent: Feb. 17, 2026

(54) VEHICLE BASED ENDPOINT DETECTION AND RESPONSE

(71) Applicant: INTERNATIONAL BUSINESS MACHINES CORPORATION, Armonk, NY (US)

(72) Inventors: Mauro Marzorati, Lutz, FL (US); Carolina Garcia Delgado, Zapopan (MX); Jeremy R. Fox, Georgetown, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 18/055,432

(22) Filed: Nov. 15, 2022

(65) Prior Publication Data
US 2024/0161603 A1 May 16, 2024

(51) Int. Cl.
*G08G 1/01* (2006.01)
*G06V 20/58* (2022.01)

(52) U.S. Cl.
CPC .......... *G08G 1/0112* (2013.01); *G06V 20/58* (2022.01); *G06V 2201/08* (2022.01)

(58) Field of Classification Search
CPC .............. G08G 1/0112; G08G 1/0175; G08G 1/096791; G06V 20/58; G06V 2201/08; G06V 20/56
See application file for complete search history.

(56) References Cited

U.S. PATENT DOCUMENTS

| 9,796,400 | B2 | 10/2017 | Puttagunta | |
|---|---|---|---|---|
| 11,222,219 | B2 | 1/2022 | Lund | |
| 11,417,109 | B1 * | 8/2022 | Theimer | H04L 67/12 |
| 11,854,277 | B1 * | 12/2023 | Xu | G06T 7/174 |
| 2020/0231121 | A1 * | 7/2020 | Dudekula | G06Q 50/40 |

(Continued)

FOREIGN PATENT DOCUMENTS

CN 105976034 A 9/2016

OTHER PUBLICATIONS

Cerna, et al.; "The Fundamentals of FFT-Based Signal Analysis and Measurement", National Instruments, Application Note 041, Jul. 2000, pp. 1-20.

(Continued)

*Primary Examiner* — Ig T An
(74) *Attorney, Agent, or Firm* — Tihon Poltavets

(57) ABSTRACT

A method for endpoint detection and response utilizing vehicle based observations includes instructing a participating vehicle to perform a plurality of observations of a surrounding environment utilizing a plurality of devices on the participating vehicle. The method also includes receiving a first initial characterization of a first observation of the surrounding environment by a first device out of the plurality of devices on the participating vehicle. The method also includes analyzing the first initial characterization of the first observation of the surrounding environment by the first device out of the plurality of devices on the participating vehicle to confirm an action to remediate an event associated with the first observation. The method also includes performing the action to remediate an event associated with the first observation.

20 Claims, 5 Drawing Sheets

(56) References Cited

U.S. PATENT DOCUMENTS

2022/0381566 A1* 12/2022 Rashty ................. G01S 19/485
2023/0360519 A1* 11/2023 Sudhir ............... G01C 21/3697

OTHER PUBLICATIONS

Disclosed Anonymously, "In-Vehicle Infotainment (IVI) System User Interface (UI) Enhancement", IPCOM000257833D, Mar. 14, 2019, pp. 1-11.

Disclosed Anonymously, "Method and System for Assisting Rental Company Staff to Manage Their Fleet by Using Augmented Reality and Digital Twin Technology", IPCOM000262525D, Jun. 9, 2020, pp. 1-5.

Disclosed Anonymously, "Optimal Selection of Autonomous Vehicle Based on Predicted Confidence Level to Overcome Estimated Surrounding Context", IPCOM000265659D, May 4, 2021, pp. 1-6.

Disclosed Anonymously,; "IOT Device for Vehicle Analytics and Smart Actions", IPCOM000255170D, Sep. 6, 2018, pp. 1-22.

ip.com., "Method to Extract Weather Information from an After-Market GPS Apparatus" https://priorart.ip.com/IPCOM/000178113, Jan. 15, 2009, pp. 1-2.

Oyekanlu, et al.; A Review of Recent Advances in Automated Guided Vehicle Technologies: Integration Challenges and Research Areas for 5G-Based Smart Manufacturing Application, 2020, IEEE Access, https://www.researchgate.net/publication/346641010, pp. 1-43.

Automotive Camera Market Size, Share & Analysis, Retrieved from: https://www.marketsandmarkets.com/Market-Reports/automotive-camera-market-125124333.html, Jun. 2024, 14 pages.

Liu, N., EDR Reaches Wide Adoption Paving Way for XDR, SASE, Retrieved from https://www.sdxcentral.com/articles/news/edr-reaches-wide-adoption-paving-way-for-xdr-sase/2021/09/ Sep. 5, 2021, 4 pages.

Nardi, T., Identifying Malware by Sniffing Its EM Signature, Retrieved from: https://hackaday.com/2022/01/19/identifying-malware-by-sniffing-its-em-signature/ 14 pages.

Reportlinker, "Endpoint Detection and Response Market by Component, Enforcement Point, Deployment Mode, Organization Size, Vertical and Region—Global Forecast to 2021", Feb. 14, 2017, 02 pages.

Shread, P., IBM Moves Into EDR Market With ReaQta Acquisition, Retrieved from https://www.esecurityplanet.com/endpoint/ibm-moves-into-edr-market-with-reaqta-acquisition/ , Nov. 2, 2021, 5 pages.

Sicard, et al., Army Wife Uses Airtag Hack to Track Her Movers While PCSing, Retrieved from: https://www.militarytimes.com/the-home-front/2022/01/12/army-wife-uses-airtag-hack-to-track-her-moverswhile-pcsing/, Jan. 12, 2022, 8 pages.

Smith, et al., AirTags Being Used to Track People Without Their Permission, Retrieved from: AirTags being used to track people without their permission | NewsNation, Jan. 7, 2022, 13 pages.

Traugott, J., Ford's New Anti-Theft Technology Is Brilliant, Retrieved from: https://carbuzz.com/news/fords-new-anti-theft-technology-is-brilliant, Jan. 19, 2022, 6 pages.

Villaluz, K., Number of Cameras Across the World Will Reach 45 Billion by 2022, Retrieved from https://interestingengineering.com/number-of-cameras-across-the-world-will-reach-45-trillion-by-2022, Jun. 1, 2021, 57 pages.

Wikipedia, Electronic license plate, Retrieved from https://en.wikipedia.org/wiki/Electronic_license_plate, Jan. 18, 2025, 5 pages.

* cited by examiner

VEHICLE BASED ENDPOINT DETECTION AND RESPONSE

BACKGROUND

This disclosure relates generally to endpoint detection and response, and in particular to endpoint detection and response utilizing vehicle based observations.

Endpoint detection and response (EDR) typically refers to an endpoint security solution that continuously monitors end user devices to identify and respond to cyber related threats. An Internet of Thing (IoT) device represents a physical object with sensors, data processing abilities, software, and various other technologies for exchanging data with other devices and systems over various communication networks. In an IoT enabled world, where the number of devices connected to communication networks continues to grow, applicability of EDR can be expanded beyond just the cyber related threats. A modern vehicle includes various IoT solutions for capturing, processing, and exchanging data, including wireless network connectivity, sensors, radar, cameras, cloud computing, and Artificial Intelligence (AI).

SUMMARY

Embodiments in accordance with the present invention disclose a method, computer program product and computer system for endpoint detection and response utilizing vehicle based observations, the method, computer program product and computer system can, responsive to receiving confirmation to opt-in a participating vehicle, instruct the participating vehicle to perform a plurality of observations of a surrounding environment utilizing a plurality of devices on the participating vehicle. The method, computer program product and computer system can receive a first initial characterization of a first observation of the surrounding environment by a first device out of the plurality of devices on the participating vehicle. The method, computer program product and computer system can analyze the first initial characterization of the first observation of the surrounding environment by the first device out of the plurality of devices on the participating vehicle to confirm an action to remediate an event associated with the first observation. The method, computer program product and computer system can perform the action to remediate an event associated with the first observation.

DETAILED DESCRIPTION

Figure 1:
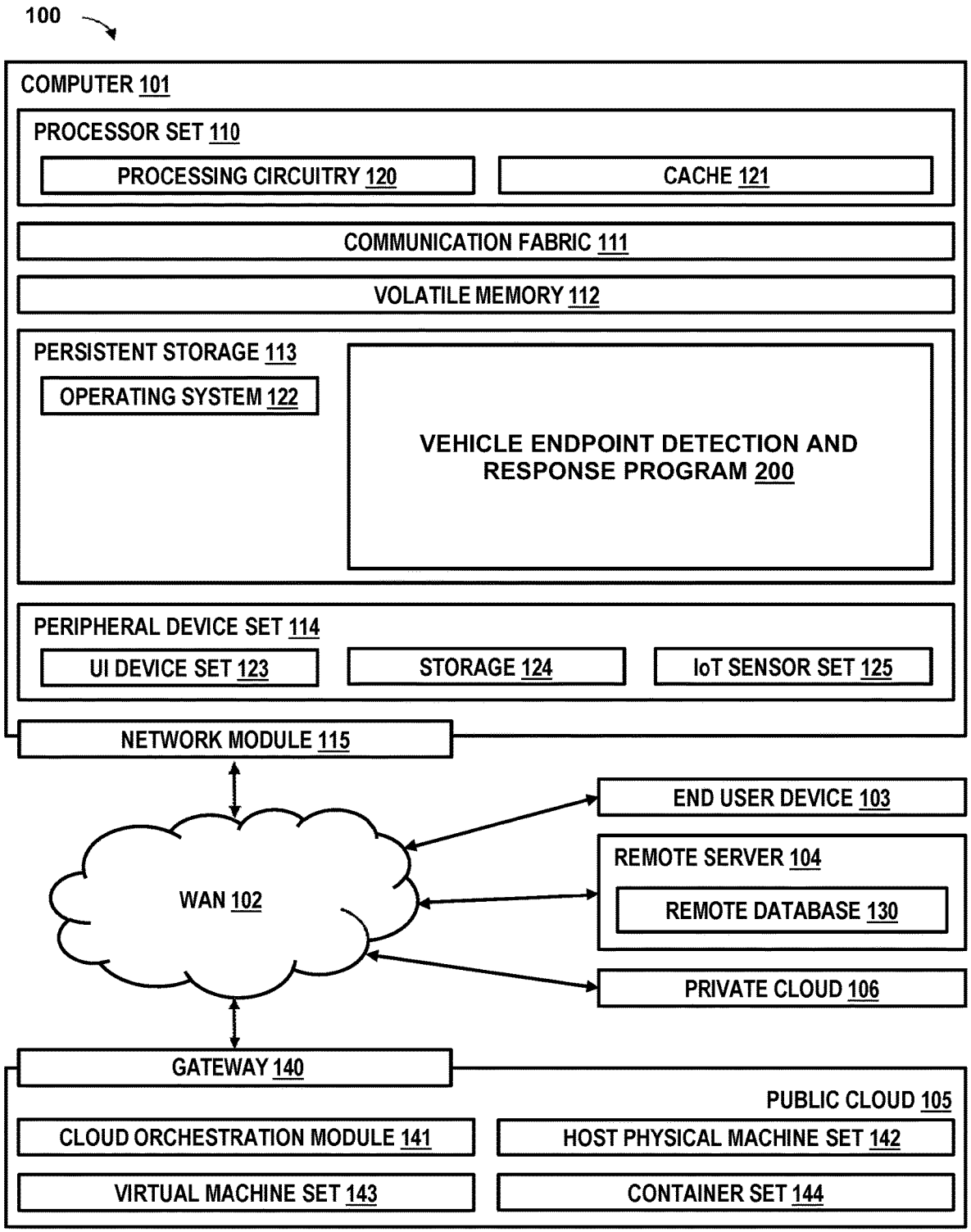
FIG. 1 is a functional block diagram illustrating a computing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments. It is to be understood that the singular forms "a," "an," and "the" include plural referents unless the context clearly dictates otherwise. Thus, for example, reference to "a component surface" includes reference to one or more of such surfaces unless the context clearly dictates otherwise.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a functional block diagram illustrating a computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 contains an example of an environment for the execution of at least some of the computer code involved in performing the inventive methods, such as vehicle endpoint detection and response program 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
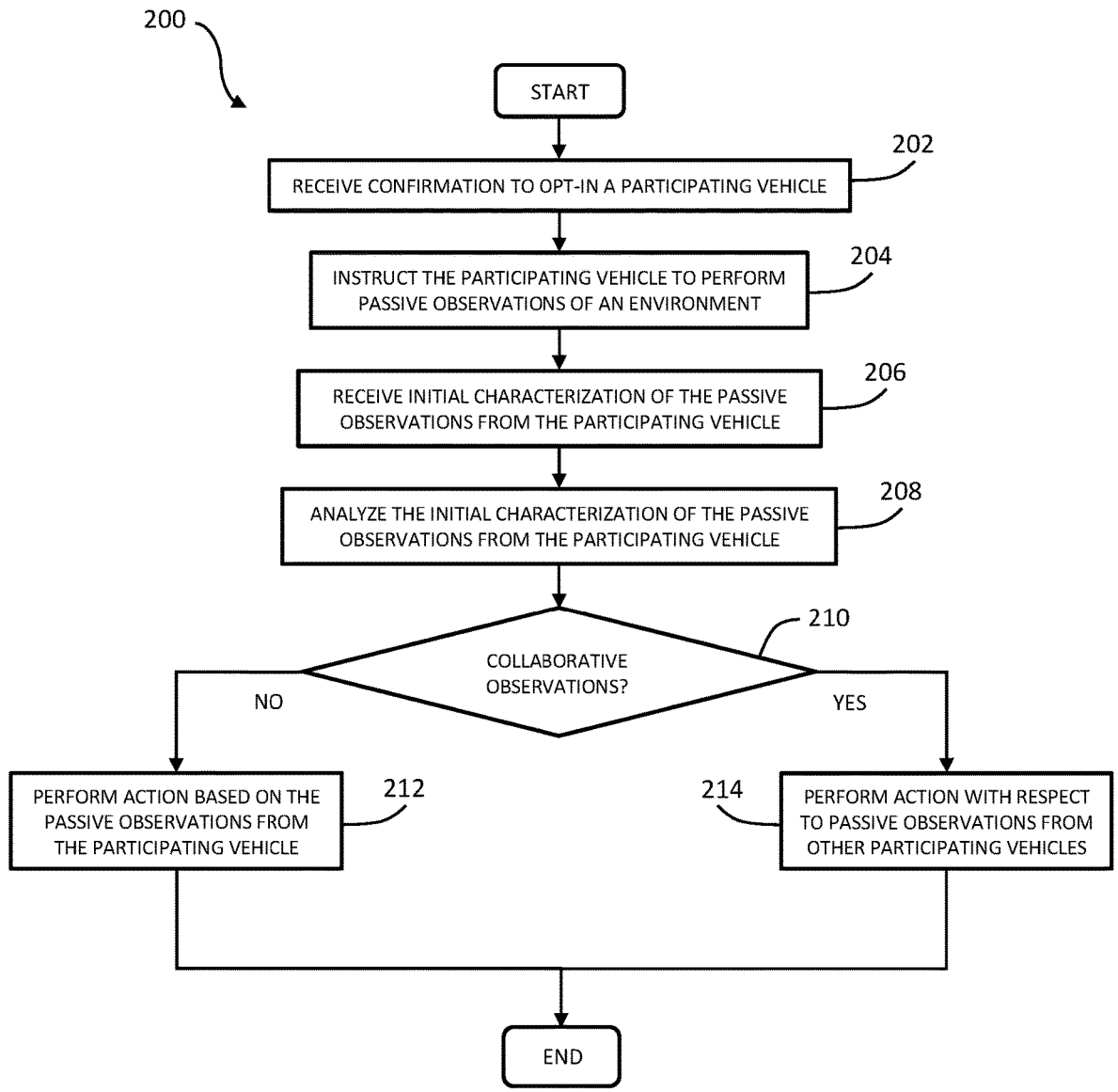
FIG. 2 depicts a flowchart of a vehicle endpoint detection and response program utilizes vehicles to observe, deduct, and respond to events, in accordance with an embodiment of the present invention.

FIG. 2 depicts a flowchart of a vehicle endpoint detection and response program utilizes vehicles to observe, deduct, and respond to events, in accordance with an embodiment of the present invention.

Vehicle endpoint detection and response program 200 receives confirmation to opt-in a participating vehicle (202). A participating vehicle represents a mode of transportation with various sensors, radars, cameras, and/or microphones for capturing passive observations of an environment surrounding the participating vehicle. To ensure a user's (i.e., vehicle's owner) privacy is maintained, vehicle endpoint detection and response program 200 can require that the user opt-in a vehicle to become a participating vehicle. Vehicle endpoint detection and response program 200 allows for the user to specify an extent of participation for the vehicle based on defined parameters for what type of data and when the data is captured for the passive observations by the participating vehicle. The type of data can be associated with the various sensors, radars, cameras, and/or microphones for capturing the passive observations of the environment surrounding the participating vehicle. For example, vehicle endpoint detection and response program 200 receives, from the vehicle's owner, confirmation to opt-in a participating vehicle, where cameras and microphones of the participating vehicle are excluded from providing data associated with the passive observations. In another example, vehicle endpoint detection and response program 200 receives, from the vehicle's owner, confirmation to opt-in a participating vehicle, where cameras and microphones positioned internally (i.e., inside the cabin) on the participating vehicle are excluded from providing data associated with the passive observation. However, cameras and microphones positioned externally (e.g., backup camera, forward facing camera) are not excluded, where vehicle endpoint detection and response program 200 can receive data from the external cameras and microphones, along with an initial characterization of the passive observations of the environment surrounding the participating vehicle.

The user defined parameters for when the data is captured can include specific hours, days, and weeks of a year for when the various sensors, radars, cameras, and/or microphones capture passive observations of the environment surrounding the participating vehicle. For example, vehicle endpoint detection and response program 200 receives, from the vehicle's owner, confirmation to opt-in a participating vehicle, where the vehicle's owner defines the parameters for when the data is captured as being between the hours of 8 pm and 6 am everyday of the week. In another example, vehicle endpoint detection and response program 200 receives, from the vehicle's owner, confirmation to opt-in a participating vehicle, where the vehicle's owner defines the parameters for when the data is captures as being between the hours of 8 am and Bpm everyday of the week. Additionally, vehicle endpoint detection and response program 200 also receives parameters for the types of data, where cameras and microphones positioned internally (i.e., inside the cabin) on the participating vehicle are excluded from providing data associated with the passive observation. In another embodiment, vehicle endpoint detection and response program 200 allows for the vehicle's owner to temporary suspend vehicle participation for a predefined duration (e.g., an hour) and/or until the vehicle's owner selects to reverse the temporary suspension of the vehicle participation. In yet another embodiment, vehicle endpoint detection and response program 200 allows for the vehicle's owner to define vehicle participation based on whether the vehicle is in motion, a speed range (e.g., 0 mph to 60 mph), and/or a geolocation (e.g., suspend vehicle participation when at a location of residency or employment). Vehicle endpoint detection and response program 200 can also identify patterns in the parameters and temporary suspensions by the vehicle's owner and determine when to instruct the participating vehicle to participate or suspend capturing data based on the identified patterns. For example, vehicle endpoint detection and response program 200 identifies a pattern of temporary suspension of observations by the vehicle's owner for the participating vehicle when at a specific location (e.g., within 100 feet of a given address, when electrically couple to a specific vehicle charging station). Vehicle endpoint detection and response program 200 determines to temporary suspend observations by the participating vehicle for a future instance when the participating vehicle approaches the specific location (e.g., within ¼ mile radius of the specific location) for which the pattern was identified.

Vehicle endpoint detection and response program 200 instructs the participating vehicle to perform passive observation of an environment (204). Based on the parameters provided by the vehicle owner's, vehicle endpoint detection and response program 200 instructs the participating vehicle to perform passive observation of the surrounding environment. Vehicle endpoint detection and response program 200 can instruct the vehicle to store the data locally on at the vehicle and/or remotely on a centralized server. In one embodiment, vehicle endpoint detection and response program 200 instructs the participating vehicle to continuously perform the passive observation of the surrounding environment according to the parameters provided by the vehicle's owner. In another embodiment, vehicle endpoint detection and response program 200 instructs the participating vehicle to perform the passive observation of the surrounding in response to receive notice of an event in a vicinity of the participating vehicle. In one example, vehicle endpoint detection and response program 200 receives an event notice from a local municipality organization of a possible missing person from neighborhood A driving a red vehicle with license plate "ABC123", where neighborhood A is geofenced by several streets of a mapped area. Vehicle endpoint detection and response program 200 instructs the participating vehicle currently located in neighborhood A to perform passive observations of the environment utilizing one or more cameras to capture images of license plates of red vehicles, along with geographical metadata indicating a location for each image. In another example, vehicle endpoint detection and response program 200 receives an event notice from another participating vehicle that experienced an airbag deployment at a specific location along road AB. Vehicle endpoint detection and response program 200 instructs the participating vehicle traveling along road AB that is approaching the specific location to perform passive observation of the surrounding environment.

Vehicle endpoint detection and response program 200 receives initial characterization of the passive observation from the participant vehicle (206). As the previously discussed, the participating vehicle represents an endpoint device capable of capturing, processing, and exchanging data. In the embodiments where vehicle endpoint detection and response program 200 instructs the participating vehicle to perform passive observations due to an event notice, vehicle endpoint detection and response program 200 receives an initial characterization of alerting for the passive observations from the participant vehicle, where the participant vehicle (i.e., endpoint device) performs the initial characterization of the passive observations. From a previous example, vehicle endpoint detection and response program 200 receives an event notice from a local municipality organization of a possible missing person from neighborhood A driving a red vehicle with license plate "ABC123" and instructs the participating vehicle currently located in neighborhood A to perform passive observations of the environment. The participating vehicle captured multiple images of license plates of red vehicles in neighborhood A and locally processes the multiple images to determine that an image of a red vehicle includes the license plate "ABC123". Vehicle endpoint detection and response program 200 receives the initial characterization of alerting that the vehicle for the missing person has been located based on the image of the red vehicle that includes the license plate "ABC123". Alternatively, the participating vehicle can send the multiple images for processing to a remote server and receive verification once the license plate "ABC123" has been identified.

From another previous example, vehicle endpoint detection and response program 200 receives an event notice from another participating vehicle that experienced an airbag deployment at a specific location along road AB and 200 instructs the participating vehicle traveling along road AB that is approaching the specific location to perform passive observation of the surrounding environment. The participating vehicle captures multiple videos of the specific location utilizing multiple cameras positioned on the exterior of the participating vehicle, along with any data from a light detection and ranging (LIDAR) of the participating vehicle. Vehicle endpoint detection and response program 200 receives an initial characterization of suspicion for the passive observations that indicates no vehicle was identifiable in the multiple videos of the specific location utilizing the multiple cameras positioned on the exterior of the participating vehicle. However, the initial characterization of suspicion for the passive observations also indicate a LIDAR detection of a vehicle sized object located adjacent to road AB, where none of the multiple cameras were able to capture an image and/video of the vehicle sized object.

In other embodiments, vehicle endpoint detection and response program 200 can continuously receive initial characterizations of passive observations from the participating vehicle, without providing the event notice. The participating vehicle can perform the passive observations (i.e., capture data), process the observations, and exchange an initial characterization of an event that might be occurring. For example, the participating vehicle is parked in a garage structure and performs passive observations, where a camera and a microphone capture an active alarm of another vehicle in the garage structure. The participating vehicle performs an initial characterization that no other vehicle in the garage structure currently has an active alarm, ruling out a common cause (e.g., seismic event). Therefore, the participating vehicle initially characterizes the active alarm of the other vehicle in the garage structure as suspicious and requiring action, where vehicle endpoint detection and response program 200 receives the initial characterization of the passive observations. In another example, the participating vehicle is parked at a public park and performs passive observation, where an infrared sensor on the participating vehicle captures a growing heat signature in the surrounding area. The participating vehicle performs an initial characterization that the heat signature appears to be expanding over time (e.g., doubled in dimension in 5 minutes). Furthermore, the infrared sensor and multiple cameras positioned on the exterior of the participating vehicle have not detected a person in the in surrounding area. Therefore, the participating vehicle initially characterizes the heat signature as suspicious and requiring action, where vehicle endpoint detection and response program 200 receives the initial characterization of the passive observations.

Vehicle endpoint detection and response program 200 analyzes the initial characterization of the passive observations from the participating vehicle (208). In this embodiment, vehicle endpoint detection and response program 200 analyzes the initial characterization of the passive observations via a Naïve Bayesian aggregation of signal or anomaly detections utilizing supervised or unsupervised machine learning. For the specific location associated with the passive observations by the participating vehicle utilized for the initial characterization, vehicle endpoint detection and response program 200 can establish an area surrounding the specific location depending on the initial characterization of the passive observation. For the area surrounding the specific location, vehicle endpoint detection and response program 200 identifies participating vehicles and non-participating vehicles. In one example, vehicle endpoint detection and response program 200 can send a location query to a general area, where participating vehicles respond with a current location. Based on the received responses of with the current locations from the participating vehicles, vehicle endpoint detection and response program 200 can identify a portion of the participating vehicles that are located in the area surrounding the specific location. To identify non-participating vehicles, vehicle endpoint detection and response program 200 queries the portion of the participating vehicles to identify vehicles in a vicinity (i.e., surrounding area) of each participating vehicle from the portion of the participating vehicles utilizing the various sensors, radars, cameras, and/or microphones of each participating vehicle. Vehicle endpoint detection and response program 200 can correlate identified vehicles in the vicinity of each participating vehicle from the other participating vehicles to known locations for the other participating vehicles, to determine which of the identified vehicles are non-participating vehicles.

In analyzing the initial characterization of the passive observation from the participating vehicle, vehicle endpoint detection and response program 200 can determine whether similar initial characterizations of passive observations were received from the other participating vehicles located in the area surrounding the specific location. In one embodiment, vehicle endpoint detection and response program 200 determines there are similar initial characterizations of passive observations in the area surrounding the specific location. From a previous example, vehicle endpoint detection and response program 200 receives an initial characterization alerting that a vehicle for a missing person has been located based on a captured image of a red vehicle that includes license plate "ABC123". Vehicle endpoint detection and response program 200 analyzes the initial characterization of the passive observations and determines that the vehicle associated with the missing person has been identified and determines whether other initial characterizations of passive observations from other participating vehicles exist in an area surrounding the specific location. If at least one other participating vehicle includes a similar initial characterization of the passive observations (i.e., identified license plate "ABC123"), vehicle endpoint detection and response program 200 determines the initial characterization by the participating vehicle is accurate and an action is required with respect to the red vehicle with the identified license plate "ABC123".

From another previous example, vehicle endpoint detection and response program 200 receives an initial characterization of suspicion indicating a LIDAR detection of a vehicle sized object located adjacent to road AB, where no cameras on the participating vehicle were able to capture an image and/video of the vehicle sized object. Vehicle endpoint detection and response program 200 analyzes the initial characterization of the passive observations from the participating vehicle and determines that though there is no image or video that captured the vehicle sized object, the vehicle sized object as detected by the LIDAR is present due to the received airbag deployment from the other participating vehicle. As previously noted, the other participating vehicle represents another vehicle connected to a communications network and though the other participating vehicle can transmit location information, the other participating vehicle is not visible from road AB. However, the LIDAR detection of a vehicle sized object adjacent to road AB by the participating vehicle indicates to vehicle endpoint detection and response program 200 where the other participating vehicle with the airbag deployment is located. Therefore, vehicle endpoint detection and response program 200 determines the initial characterization by the participating vehicle is accurate and an action is required with respect to the other participating vehicle with the airbag deployment.

Vehicle endpoint detection and response program 200 determines whether collaborative observations are possible for the geolocation with the received passive observations (decision 210). Collaborative observations indicate whether at least one other participating vehicle is able to provide initial characterization of passive observations at the specific location for which vehicle endpoint detection and response program 200 received the initial characterization of passive operations from the participating vehicle in (206). In the event vehicle endpoint detection and response program 200 determines that collaborative observations are not possible for the geolocation with the receive passive observations ("no" branch, decision 210), vehicle endpoint detection and response program 200 performs an action based on the passive observation from the participating vehicle (212). In the event vehicle endpoint detection and response program 200 determines that collaborative observations are possible for the geolocation with the receive passive observations ("yes" branch, decision 210), vehicle endpoint detection and response program 200 performs an action with respect to passive observations from ither participating vehicles (214).

Vehicle endpoint detection and response program 200 performs an action based on the passive observation from the participating vehicle (212). Vehicle endpoint detection and response program 200 performs an action based on passive observations from the participating vehicle to remediate any impact from an event associated with the initial characterization of the passive observations. In this embodiment, vehicle endpoint detection and response program 200 performs an action based on the initial characterization of the passive observations by the participating vehicle and the analysis of the initial characterization of the passive observations. From a previously discussed example, vehicle endpoint detection and response program 200 receives an initial characterization from a participating vehicle that an active alarm of another vehicle in a garage structure is suspicious and requires action. Since other participating vehicles are not able to corroborate the suspicious activity, vehicle endpoint detection and response program 200 performs an action with a lower level of urgency when compared to suspicious activity that can be corroborated by other participating vehicles. In one example, the lower level of urgency action can include vehicle endpoint detection and response program 200 identifying an owner of the vehicle with the active alarm based on a license plate on the vehicle and contacting the owner via an electronic device with an electronic message regarding the active alarm. In another example, the lower level of urgency action can include vehicle endpoint detection and response program 200 identifying a management company (i.e., third party) for the garage structure and contacting the management company with an electronic message regarding the active alarm with vehicle identification information, vehicle location information within the garage structure, and/or the participating vehicle information responsible for the passive observations.

From another previously discussed example, vehicle endpoint detection and response program 200 receives an initial characterization from a participating vehicle that characterizes a heat signature captured by an infrared camera on participating vehicle as suspicious and requiring action. Since other participating vehicles are not able to corroborate the suspicious event, vehicle endpoint detection and response program 200 performs an action with a lower level of urgency when compared to a suspicious event that can be corroborated by other participating vehicles. In one example, the lower level of urgency action can include vehicle endpoint detection and response program 200 sending an electronic message to the owner of the participating vehicle that an infrared camera captured a suspicious heat signature, where the electronic message includes an image and/or video of the heat signatures. Vehicle endpoint detection and response program 200 can also provide an image and/or video of camera directed towards an area where the heat signature was captured. The owner of the participating vehicle can take action by calling appropriate emergency services (e.g., fire rescue) or flagging the initial characterization as inaccurate. In some embodiments, vehicle endpoint detection and response program 200 provides selectable options to the owner of the participating vehicle, where the owner can select an option to flag the initial characterization as inaccurate and utilize the flagging in a historical learning model for future analysis of initial characterizations of passive observations. Another selectable option includes contact local emergency services, where vehicle endpoint detection and response program 200 sends an electronic message regarding a potential fire (i.e., heat signature), where the electronic message can include a location for the participating vehicle, a position of the heat signature with respect to the location of the participating vehicle, contact information for the owner of the participating vehicle, an image and/or video of the infrared camera, and an image and/or video of the camera directed towards an area where the heat signature is located.

Vehicle endpoint detection and response program 200 performs an action with respect to passive observations from other participating vehicles (214). Vehicle endpoint detection and response program 200 performs an action with respect to passive observations from other participating vehicles to remediate any impact from an event associated with the initial characterization of the passive observations. In this embodiment, vehicle endpoint detection and response program 200 performs an action based on the initial characterization of the passive observations by the participating vehicle, the analysis of the initial characterization of the passive observations, an initial characterization of the passive observations another participating vehicle, and analysis of the initial characterization of the passive observations by the other participating vehicle. From a previously discussed example, vehicle endpoint detection and response program 200 receives an initial characterization from a participating vehicle that an active alarm of another vehicle in a garage structure is suspicious and requires action. Another participating vehicle is able corroborate the suspicious activity by providing similar initial characterization of passive observation and vehicle endpoint detection and response program 200 performs an action with a higher level of urgency when compared to suspicious activity that cannot be corroborated by other participating vehicles. In one example, the higher level of urgency action can include vehicle endpoint detection and response program 200 contacting a security company for the garage structure with an electronic message regarding the active alarm for the other vehicle, along with vehicle identification information, vehicle location information within the garage structure, and/or identification information for the two participating responsible for the passive observations. In another example, the higher level of urgency action can include vehicle endpoint detection and response program 200 contacting local authorities regarding the active alarm for the other vehicle, along with vehicle identification information, vehicle location information within the garage structure, and/or identification information for the two participating responsible for the passive observations.

From another previously discussed example, vehicle endpoint detection and response program 200 receives an initial characterization from a participating vehicle that characterizes a heat signature captured by an infrared camera on participating vehicle as suspicious and requiring action. Vehicle endpoint detection and response program 200 previously determined there is at least one other participating vehicle that is able to corroborate the suspicious event, vehicle endpoint detection and response program 200 performs an action with a higher level of urgency when compared to a suspicious event that cannot be corroborated by other participating vehicles. In one example, the higher level of urgency action can include vehicle endpoint detection and response program 200 instructing the other participating vehicle to verify the initial characterization of the passive observations of the suspicious event. Verifying can include instructing the other participating vehicle to relocate to a location where the participating vehicle is located to provide infrared camera images and/or videos of the heat signature (i.e., passive observations. Vehicle endpoint detection and response program 200 can receives initial characterizations of the passive observations from the other participating vehicle and can verify the suspicious event of the heat signature based on an analysis of the initial characterizations of the passive observations from the other participating vehicle. Upon verifying the initial characterizations of the passive observations from the other participating vehicle, vehicle endpoint detection and response program 200 sends an automated message regarding a potential fire (i.e., heat signature), where the automated message can include a location for the participating vehicle, a position of the heat signature with respect to the location of the participating vehicle, a position of the heat signature with respect to the location of the other participating vehicle, contact information for the owner of the participating vehicle, contact information for the owner of the other participating vehicle, an image and/or video of the infrared camera from the participating vehicle, an image and/or video of the infrared camera from the other participating vehicle, an image and/or video of the camera directed towards an area where the heat signature is located from the participating vehicle, and an image and/or video of the camera directed towards an area where the heat signature is located from the other participating vehicle.

Figure 3A:
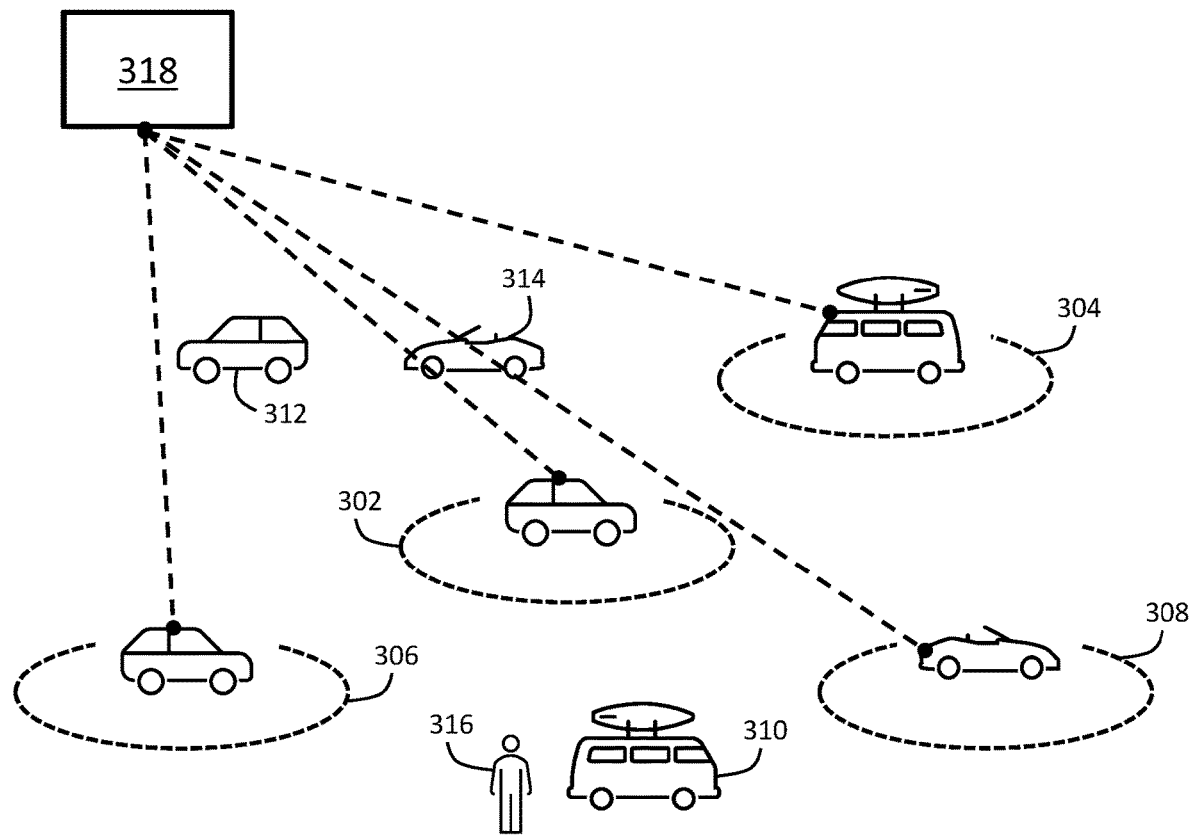
FIG. 3A depicts an illustrative example of a vehicle endpoint detection and response program receiving initial characterization of passive observations from participating vehicles, in accordance with an embodiment of the present invention.

FIG. 3A depicts an illustrative example of a vehicle endpoint detection and response program receiving initial characterization of passive observations from participating vehicles, in accordance with an embodiment of the present invention. For a given location, vehicle endpoint detection and response program 200 identifies participating vehicles 302, 304, 306, 308, and 310, based on a signal emitted and based on receiving a confirmation to opt-in each of the participating vehicles 302, 304, 306, and 308 to participate in the augmented vigilance. Non-participating vehicles 310, 312 and 314 represent vehicles that have not emitted a signal and/or vehicles for which vehicle endpoint detection and response program 200 did not receive a confirmation to opt-in into the augmented vigilance. Non-participating vehicle 310 includes individual 316 located in a vicinity, where vehicle endpoint detection and response program 200 identify individual 316 utilizing participating vehicles 302, 306, and 308, discussed in further detail with regards to FIG. 3C. Vehicle endpoint detection and response program 200 operates as aggregate 318 and instructs participating vehicles 302, 304, 306, 308, and 310 on board signal processing to characterize acquired observation, which can include querying data storages on the cloud or locally stored replicas. Vehicle endpoint detection and response program 200 can receive detected observation and characterization from any of participating vehicles 302, 304, 306, 308, and 310, either directly through a wider communication network or through a localized communication network to another participating vehicle that can connection to the wider communication network. For example, if participating vehicle 304 is parked and located in an area with limited connectivity to the wider communication network, participating vehicle 304 can offload the data to traveling participating vehicle 302 via a localized communication network utilizing store-and-forward techniques. Once participating vehicle 302 leaves the area with the limited connectivity and can connect to the wider communication network, participating vehicle 302 can send the initial characterizations of the passive observation for participating vehicle 304 to vehicle endpoint detection and response program 200 for analyzing.

Figure 3B:
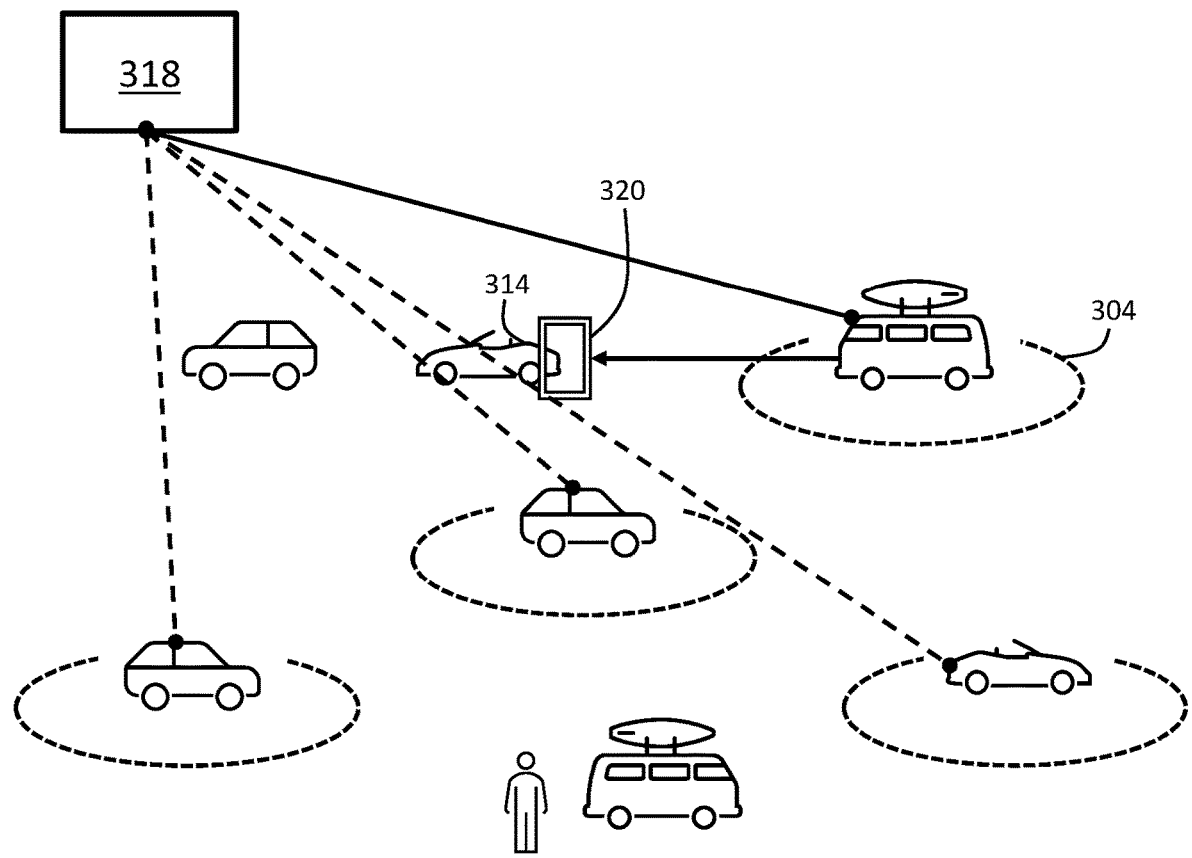
FIG. 3B depicts an illustrative example of a vehicle endpoint detection and response program utilizing a participating vehicle to identify a flagged license plate, in accordance with an embodiment of the present invention.

FIG. 3B depicts an illustrative example of a vehicle endpoint detection and response program utilizing a participating vehicle to identify a flagged license plate, in accordance with an embodiment of the present invention. In this example, vehicle endpoint detection and response program 200 (i.e., aggregate 318) utilizes visual or electronic means to identify license plate 320 of non-participating vehicle 314. Visual means can include a forward facing camera on participating vehicle 304 capturing an image of license plate 320 and determining that license plate 320 has been tagged due to an event notice (e.g., missing persons alert). Electronic means can include an embedded electromagnetic emission type device on license plate 320, commonly referred to as an electronic license plate, for communicating information to participating vehicle 304. Vehicle endpoint detection and response program 200 can send the event notice to any participating vehicles (e.g., participating vehicle 304) within a given location to search for license plate 320 associated with the event notice. In the event participating vehicle 304 initially characterizes an image (i.e., passive observation) of license plate 320 as being associated with the event notice, vehicle endpoint detection and response program 200 receives the initial characterization of the passive observation from participating vehicle 304 for analyzing and action. In this example, vehicle endpoint detection and response program 200 determines there are no additional participating vehicles to perform collaborative observations and performs an action based on the passive observation from participating vehicle 304.

Figure 3C:
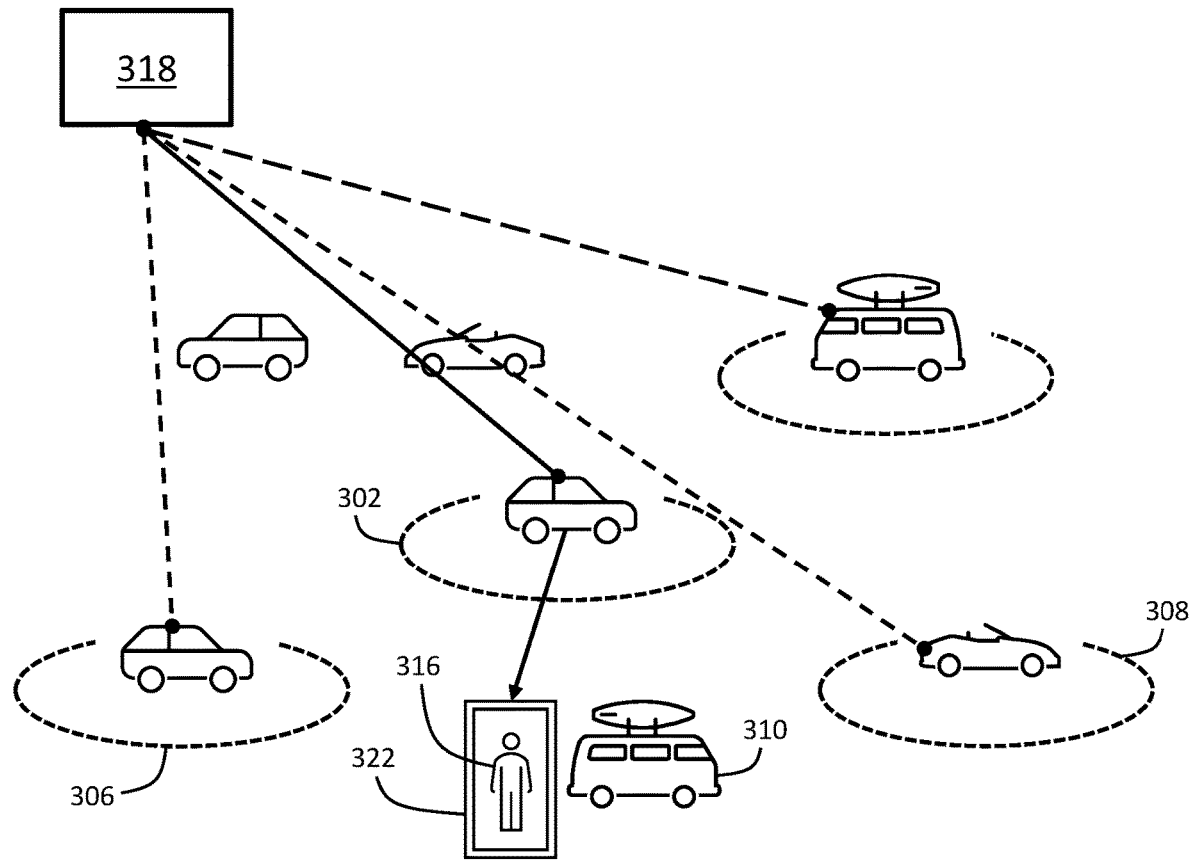
FIG. 3C depicts an illustrative example of a vehicle endpoint detection and response program reporting suspicious activity and corroborating vehicle ownership, in accordance with an embodiment of the present invention.

FIG. 3C depicts an illustrative example of a vehicle endpoint detection and response program reporting suspicious activity and corroborating vehicle ownership, in accordance with an embodiment of the present invention. In this example, vehicle endpoint detection and response program 200 (i.e., aggregate 318) receives initial characterization of passive observations from participating vehicle 302 that is traveling along a road, where participating vehicle 302 identifies suspicious activity 322 with regards to person 312 located near non-participating vehicle 310 utilizing multiple external cameras and microphone. Vehicle endpoint detection and response program 200 characterizes an active alarm of non-participating vehicle 310 with individual 316 as suspicious activity 322 that requires action. Vehicle endpoint detection and response program 200 analyzes the initial characterization and determines there are other participating vehicles (i.e., participating vehicles 306 and 308) in the vicinity to perform collaborative observations. Vehicle endpoint detection and response program 200 performs collaborative observations by querying participating vehicle 306 and 308 to provide additional initial characterization of passive observations. Participating vehicles 306 and 308 both identify individual 316 as the rightful owner of non-participating vehicle 310 based on the alarm no longer being active. Since participating vehicle 302 was in motion traveling past non-participating vehicle 310, participating vehicle was not able to capture the alarm deactivating and thus flag suspicious activity 312 with regards to individual 316 located near non-participating vehicle 310. However, participating vehicles 306 and 308 are both parked and can provide a continuous camera feed suspicious activity 322. Both participating vehicles 306 and 308 perform an initial characterization of suspicious activity 322 and determine an alarm for nonparticipating vehicle 310 is no longer active. Vehicle endpoint detection and response program 200 receive the initial characterization of the passive observation of suspicious activity 322 from participating vehicles 306 and 308 and removes the mark of suspicious activity 322 from individual 316 located near non-participating vehicle 310. In various other embodiment, vehicle endpoint detection and response program 200 can utilize camera footage from other devices (e.g., camera on a wearable device) in a vicinity of a specific location associated with the initial characterization of the passive observations from a participating vehicle. Vehicle endpoint detection and response program 200 can also utilize various object recognition software to identify various types of hazardous objects, along with stationary and mobility based image acquisition techniques to capture the various objects.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   instructing a first participating vehicle to perform a plurality of observations of a surrounding environment utilizing a plurality of devices on the first participating vehicle;
   receiving a first initial characterization of a first observation of the surrounding environment by a first device out of the plurality of devices on the first participating vehicle;
   analyzing the first initial characterization of the first observation of the surrounding environment by the first device out of the plurality of devices on the first participating vehicle to confirm a first action to remediate an event associated with the first observation, wherein the first action has a first level of urgency;
   instructing a second participating vehicle to verify the first initial characterization of the first observation;
   receiving, from the second participating vehicle, a second initial characterization of a second observation of the surrounding environment by a first device out of the plurality of devices on the second participating vehicle;
   verifying, based on an analyzing of the second initial characterization of the second observation, the first initial characterization of the first observation; and
   performing a second action to remediate the event associated with the first observation based on the verifying of the first initial characterization of the first observation, wherein a second level of urgency of the second action is higher than the first level of urgency for the first action.

2. The method of claim 1, further comprising:
   receiving a confirmation to opt-in the first participating vehicle, wherein the confirmation specifies an extent of participation based on a type of data and when the data is captured for the plurality of observations that includes the first observation.

3. The method of claim 1, further comprising:
   determining whether collaborative observations are possible for a geolocation associated with the surrounding environment;
   determining collaborative observations are possible for the geolocation associated with the surrounding environment; and
   analyzing the second initial characterization of the second observation of the surrounding environment by the first device out of the plurality of devices on the second participating vehicle to confirm the second action to remediate the event associated with the first observation.

4. The method of claim 1, wherein the first initial characterization by the first device out of the plurality of devices on the first participating vehicle is received via the second participating vehicle.

5. The method of claim 1, wherein the first observation is associated with identifying a flagged license plate on another vehicle.

6. The method of claim 1, wherein the first observation is associated with suspicious activity that includes an individual in a vicinity of another vehicle.

7. The method of claim 1, wherein the second action includes contacting local emergency services.

8. A computer program product comprising:
   one or more computer readable storage media; and
   program instructions stored on the one or more computer readable storage media to perform operations comprising:

instructing a first participating vehicle to perform a plurality of observations of a surrounding environment utilizing a plurality of devices on the first participating vehicle;

receiving a first initial characterization of a first observation of the surrounding environment by a first device out of the plurality of devices on the first participating vehicle;

analyzing the first initial characterization of the first observation of the surrounding environment by the first device out of the plurality of devices on the first participating vehicle to confirm a first action to remediate an event associated with the first observation, wherein the first action has a first level of urgency;

instructing a second participating vehicle to verify the first initial characterization of the first observation;

receiving, from the second participating vehicle, a second initial characterization of a second observation of the surrounding environment by a first device out of the plurality of devices on the second participating vehicle;

verifying, based on an analyzing of the second initial characterization of the second observation, the first initial characterization of the first observation; and performing a second action to remediate the event associated with the first observation based on the verifying of the first initial characterization of the first observation, wherein a second level of urgency of the second action is higher than the first level of urgency for the first action.

9. The computer program product of claim 8, wherein the operations further comprise:

receiving a confirmation to opt-in the first participating vehicle, wherein the confirmation specifies an extent of participation based on a type of data and when the data is captured for the plurality of observations that includes the first observation.

10. The computer program product of claim 8, wherein the operations further comprise:

determining whether collaborative observations are possible for a geolocation associated with the surrounding environment;

determining collaborative observations are possible for the geolocation associated with the surrounding environment; and analyzing the second initial characterization of the second observation of the surrounding environment by the first device out of the plurality of devices on the second participating vehicle to confirm the second action to remediate the event associated with the first observation.

11. The computer program product of claim 8, wherein the first initial characterization by the first device out of the plurality of devices on the first participating vehicle is received via the second participating vehicle.

12. The computer program product of claim 8, wherein the first observation is associated with identifying a flagged license plate on another vehicle.

13. The computer program product of claim 8, wherein the first observation is associated with suspicious activity that includes an individual in a vicinity of another vehicle.

14. The computer program product of claim 8, wherein the second action includes contacting local emergency services.

15. A computer system comprising:

a processor set;

one or more computer readable storage media; and program instructions stored on the one or more computer readable storage media to cause the processor set to perform operations comprising:

instructing a first participating vehicle to perform a plurality of observations of a surrounding environment utilizing a plurality of devices on the first participating vehicle;

receiving a first initial characterization of a first observation of the surrounding environment by a first device out of the plurality of devices on the first participating vehicle;

analyzing the first initial characterization of the first observation of the surrounding environment by the first device out of the plurality of devices on the first participating vehicle to confirm a first action to remediate an event associated with the first observation, wherein the first action has a first level of urgency;

instructing a second participating vehicle to verify the first initial characterization of the first observation;

receiving, from the second participating vehicle, a second initial characterization of a second observation of the surrounding environment by a first device out of the plurality of devices on the second participating vehicle;

verifying, based on an analyzing of the second initial characterization of the second observation, the first initial characterization of the first observation; and performing a second action to remediate the event associated with the first observation based on the verifying of the first initial characterization of the first observation, wherein a second level of urgency of the second action is higher than the first level of urgency for the first action.

16. The computer system of claim 15, wherein the operations further comprise:

receiving a confirmation to opt-in the first participating vehicle, wherein the confirmation specifies an extent of participation based on a type of data and when the data is captured for the plurality of observations that includes the first observation.

17. The computer system of claim 15, wherein the operations further comprise:

determining whether collaborative observations are possible for a geolocation associated with the surrounding environment;

determining collaborative observations are possible for the geolocation associated with the surrounding environment; and analyzing the second initial characterization of the second observation of the surrounding environment by the first device out of the plurality of devices on the second participating vehicle to confirm the second action to remediate the event associated with the first observation.

18. The computer system of claim 15, wherein the first initial characterization by the first device out of the plurality of devices on the first participating vehicle is received via the second participating vehicle.

19. The computer system of claim 15, wherein the first observation is associated with identifying a flagged license plate on another vehicle.

20. The computer system of claim 15, wherein the first observation is associated with suspicious activity that includes an individual in a vicinity of another vehicle.

* * * * *